US006482462B2

(12) United States Patent
De Kezel et al.

(10) Patent No.: US 6,482,462 B2
(45) Date of Patent: *Nov. 19, 2002

(54) QUICK-SETTING STARCH COMPOSITION AND STARCH GUM CONFECTION

(75) Inventors: Hubert De Kezel, Zelzate (BE); Michel Henri André Gonze, Brussels (BE)

(73) Assignee: Cerestar Holding B.V., Sas van Gent (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,487

(22) Filed: Jul. 7, 1999

(65) Prior Publication Data

US 2002/0025368 A1 Feb. 28, 2002

(30) Foreign Application Priority Data

Jul. 7, 1998 (GB) .............................................. 9814570

(51) Int. Cl.[7] ............................................. A23L 1/0522
(52) U.S. Cl. ...................................................... 426/578
(58) Field of Search ................................ 426/578, 555, 426/554, 573, 576, 579

(56) References Cited

U.S. PATENT DOCUMENTS

| 1,928,901 | A |   | 10/1933 | Krno et al. |        |
|-----------|---|---|---------|-------------|--------|
| 3,617,322 | A | * | 11/1971 | Clement     | 106/213|
| 4,073,959 | A |   | 2/1978  | Durand      | 426/578|
| 4,117,176 | A |   | 9/1978  | Taylor et al.| 426/660|
| 4,510,166 | A | * | 4/1985  | Lenchin et al.| 426/565|
| 4,622,226 | A | * | 11/1986 | Ke et al.   | 426/94 |
| 5,034,239 | A |   | 7/1991  | Mauro et al.| 426/578|
| 5,468,286 | A | * | 11/1995 | Wai-Chui et al.| 106/210|
| 5,472,732 | A | * | 12/1995 | Ohkuma et al.| 426/658|
| 5,750,168 | A | * | 5/1998  | Woerman et al.| 426/102|

FOREIGN PATENT DOCUMENTS

| DE | 1920821   | 5/1971  |
| DE | 1581 11   | 12/1982 |
| DE | 158111    | 12/1982 |
| GB | 1 286 994 | 8/1972  |

OTHER PUBLICATIONS

W. Herterich, "International Review of Sugar and Confectionary", vol. 36, No. 5, 1983, pp. 139–146.
Abstract of Japan, JP 51056335 A, May 18, 1976.
W. Herterich, "International Review for Sugar and Confectionary", vol., 36, No. 5, 1983 pp. 139–146.
Abstract of Japan, JP 51056335 A May 18, 1976.

* cited by examiner

*Primary Examiner*—Arthur L. Corbin
(74) *Attorney, Agent, or Firm*—Fitch, Even, Tabin & Flannery

(57) ABSTRACT

The present invention relates to a new starch product, useful for the production of starch gums. The product, a combination of potato and tapioca dextrin, has quick-setting properties and can be used at high dry substance. The product is advantageously used in the normal starch gum production process and results in a considerable shortening of the time required to obtain starch gums.

13 Claims, No Drawings

US 6,482,462 B2

QUICK-SETTING STARCH COMPOSITION AND STARCH GUM CONFECTION

TECHNICAL FIELD

The present invention relates to a new starch product, useful for the production of starch gums. The product, a starch or a combination of starches, has quick-setting properties and can be used at high dry substance. The product is advantageously used in the normal starch gum production process and results in a considerable shortening of the time required to obtain starch gums.

BACKGROUND OF THE INVENTION

Starch gums are produced by heating a starch and sugars suspension, mixing the cooked mass with colour, taste, and other desirable ingredients and pouring the mixture at elevated temperature in a mould. The mixture is then allowed to dry and after cooling the gums are ready for use. Depending on the composition the gums are stored either as such or they are packaged, individually or together. Traditional gum production is extensively described in Sugar Confectionery Manufacture, ed. E.B. Jackson, Blackie & Son Ltd. Glasgow-London, $1^{St}$ ed. 1990.

The critical factor as regards the production time of starch gums is the drying time. Drying takes in general from 1 to 4 days. In order to obtain a suitable starch gum it is needed that the gum contains between about 82 and 85 % dry substance. Using the normally employed starches it is not possible to attain such a high dry substance due to viscosity problems. Therefore in the normal process starches are suspended at a dry substance of about 70–75%. After moulding the products are dried in drying chambers for up to 4 days to attain the desired dry substance and for setting the starch. This means that large systems are needed, often in the form of drying chambers and a large amount of energy is used. In addition the process for obtaining starch gums is long and it is difficult to perform the production in a continuous manner. Different starch products have been developed to circumvent these problems.

Notably, high amylose starches are available for the preparation of starch gums. Although these starches confer to the mixture high gelling properties they are not usable at high dry substance and therefore they still require a long drying time.

DD 158 111 describes a method to prepare dextrins in presence of mineral acids and phosphoric acid and the use in adhesives. The addition of phosphoric acid results in ester formation, which in turn increases the adhesion.

U.S. Pat. No. 4,073,959 relates to improvements in making gelled confections which utilise the setting properties of starches. It has been found that tapioca starch cannot be used in the production of quick-setting gum confections. Acid-modified (i.e. acid-thinned) potato starches are used for the preparation of quick-setting gum confections.

U.S. Pat. No. 1,928,901 relates to the manufacture of confectionery of the gum type, such as gum drops, jellies and the like. In accordance with the method described crystalline, high purity dextrose is substituted for the cane sugar in part or wholly. During the boiling, starch (which may be a thick boiling starch but is preferably a thin boiling starch) is added in the form of a water starch suspension. The examples teach that the setting time is from about one day to 36 hours.

GB 1 286 994 relates to improved gum confections and methods of making same by replacing a portion of the sweetening constituent therein with a starch hydrolysate having a D.E from 5 to 25. Gum confections are generally comprised of three basic constituents, a) a sweetening constituent, b) starch and c) water. The starch used may be any well-known starch, corn starch being preferred. Gum confections are usually formed by first cooking starch with water and the sweetening constituent until the starch is gelatinised, forming a liquid. As can be deduced from the teaching of the examples the drying time is from about 18 hours to about 55 hours.

There exists therefore a need for a quick-setting starch, which can be used at high dry substance. The present invention provides such a product.

SUMMARY OF THE INVENTION

The present invention discloses quick-setting starch and quick setting starch compositions comprising potato or potato and tapioca dextrin. The present invention also discloses the use of these starch compositions for the preparation of starch gums.

The present invention further discloses a process for producing starch gums comprising preparing a mixture of starches at elevated temperature, moulding the product and cooling the product.

The present invention also discloses starch gums containing potato dextrin or a mixture of potato and tapioca dextrins.

DETAILED DESCRIPTION OF THE INVENTION

The present invention discloses a quick-setting starch and a quick-setting starch composition comprising potato dextrin or potato and tapioca dextrin. Dextrinisation of starch is a commonly employed process. In general, the dry starch is mixed with an acid in the liquid or gas phase where after the mixture is pre-dried, if necessary. The starch is then heated to a temperature of above 100° C. after sufficient time to obtain conversion the product is cooled and neutralised by addition of a base. Dextrinisation is a heat treatment of dry starch in presence or absence of acid, while acid-thinning is an acid treatment of a starch slurry. Dextrins are prepared according to the dextrinisation method.

The present invention makes use of a potato dextrin or a combination of tapioca and potato dextrins wherein the potato and tapioca dextrins are present in a ratio of from 5:95 to 50:50, preferably the ratio is from 10:90 to from 30:70, more preferably the ratio is 20:80. This ratio is only an indication the important thing being that the combination is used in such a ratio that there is no potato taste or other off-taste. It should be kept in mind that pure potato dextrin can favourably be used in the present invention if care is taken to remove the off-taste. Different methods are known to reduce or remove the off-taste of potato starch completely, e.g. washing with organic solvent, enzymatic treatment such treatment with peptidase can reduce the off-taste significantly.

The present invention also discloses the use of starch or starch compositions for the preparation of starch gums.

The present invention further discloses a process for producing starch gums comprising preparing a starch or mixture of starches at elevated temperature moulding the product and cooling the product. The conventional process for producing starch gums comprises the steps of heating a starch suspension, mixing the suspension with colour, taste, and other desirable ingredients and pouring the mixture at elevated temperature in a mould. The mixture is then allowed to dry and after cooling the gums are ready for use. As mentioned before the drying usually takes 1 to 4 days and in order to exploit the process on a commercial scale large, energy-consuming drying chambers are needed. By using the composition of the present invention drying time is reduced to such an extent that the process only requires a cooling step. This is achieved by adding the dextrin composition of the present invention to from 80 to 85% dry substance before heating and moulding. In a typical recipe for obtaining a starch gum according to the present invention the following ingredients are used.

| | |
|---|---|
| Sugar | 10% |
| Glucose syrup | 52% |
| Dextrins mix | 25% |
| Water | 13% |

The composition of the present invention is quick setting and the process of setting and cooling, which does not require drying only takes about 3 hours. The use of the dextrins of the present invention in the preparation of starch gums leads to a much faster and cheaper process.

As can be seen from the teaching of the examples there is a significant difference between dextrins and acid-thinned starches for producing starch gums. Gums prepared with acid thinned starches do not have the required properties, while products prepared from dextrins have superior properties.

The deposit viscosity of the starting material is so low that a high initial dry substance can be used. The process of the present invention gives rise to a product which is not too soft even without drying at a high temperature. Negative effects on colour agents or other additives are avoided as no extensive drying at high temperature is used. Furthermore, the product gums have a good and stable structure and form making it possible to demould the starch gums in the standard manner.

The potato dextrin used in the present invention is available under the trademark C☆DrySet 07905 (Cerestar) and has a moisture content of 3–6% and a Brookfield viscosity at 30% and 40° C. of between 50 and 300 mPas. The tapioca dextrin had the following characteristics Brabender viscosity 35% d.s—350 cmg, peak max. 350 B.U.(Brabender Units), 95° C. 200 B.U., Top max 200 B.U., with an end viscosity at 50° C. of min. 600 B.U. The present invention also discloses starch gums containing potato dextrin or a mixture of potato and tapioca dextrins. Such gums have excellent characteristics and are easily and quickly prepared.

The advantages of the composition of the present invention will appear from the following examples.

EXAMPLES

| | |
|---|---|
| Sugar | 10% |
| Glucose syrup*) | 52% |
| Dextrin or Dextrin mix | 25% |
| Water | 13% |

*)glucose syrup: C☆TruSweet ™ containing 9% fructose.

For comparative reasons different types of starch have been used. Care should be taken that this m,ay require some minor adaptations to temperatures and concentrations, which can be used. The following starch types were used: Regular maize, waxy maize, high amylose, potato and tapioca alone or in combination with hydrocolloids such as pectin, agar, alginate and carrageenan.

The starch gums were prepared as follows.

The ingredients of the recipe as described above were mixed and kept at 65 to 70° C. The mixture was then pumped through a jet cooker or heat exchanger until a clear solution was obtained, mostly this was achieved by cooking at a temperature of 130 to 135° C. The increase of the dry substance was carefully controlled in order not to exceed 83%. The cooked mass was kept at 90 to 95° C. until further use. Colour, acid and flavour were added and the total was mixed and deposited in a mould (either moulding starch or plastic) at 82 to 83 % dry substance about 90° C. In the cases wherein the mixtures of the present invention were used the product was stable and cool within 3 hours after which they were demoulded without any problem. Finally, the gums were polished with oil or sanded with sugar and were packed for storage.

The results obtained with different types of starch are found in Table 1.

TABLE 1

Starch gums from different types of starch

| Type of starch | Modification | Comments |
|---|---|---|
| Regular maize starch | Thinning | Too high depositing viscosity at high solids. Cloudy end product. |
| Waxy maize starch | Thinning | Not enough setting/body of the end product. Clear gums. |
| High amylose starch | Thinning | Too high cooking temperatures required. Cloudy gums and not enough setting. |
| Potato | Thinning | Off taste. Some setting. |
| | Dextrinisation | Good setting at acceptable viscosity. Clear products with potato taste. |
| Tapioca | Thinning | Not the required properties. Too high depositing viscosity. No off taste. |
| | Dextrinisation | Insufficient setting properties at high solids. Clear end product, good taste. |
| Tapioca/potato | Dextrinisation | Setting after about 3 hours. No off taste. Acceptable deposit viscosity at high solids. |

Thinning was in this case acid thinning i.e. treatment of starch slurry using HCl or $H_2SO_4$, followed by neutralisation to pH 5–5.5 with NaOH. By using different levels of acid and/or different reaction times acid-thinned starch with different viscosities were obtained. For each type of starch different viscosities were used. Dextrinisation was performed in the usual manner on dry starch, without any addition or in presence of hydrochloric acid.

What is claimed is:

1. An edible quick setting starch composition for preparing an edible starch gum confection, said composition consisting essentially of a potato dextrin and a tapioca dextrin, wherein said composition is edible and can be quickly cooled to said starch gum confection, and wherein the starch gum confection obtained from said starch composition has no potato off-taste.

2. An edible quick setting starch composition according to claim 1, wherein said potato dextrin and said tapioca dextrin are present in a ratio of from 5:95 to 50:50.

3. An edible quick setting starch composition according to claim 1, wherein said potato dextrin and said tapioca dextrin are present in a ratio of from 10:90 to 30:70.

4. An edible quick setting starch composition according to claim 1, wherein said potato dextrin and said tapioca dextrin are present in a ratio of 20:80.

5. An edible starch gum confection that consists essentially of potato dextrin and tapioca dextrin and which has at least essentially no potato off-taste, said edible starch gum confection being obtained from a quick setting starch composition consisting essentially of a potato dextrin and a tapioca dextrin.

6. An edible starch gum confection according to claim 5, wherein said potato dextrin and said tapioca dextrin are present in a ratio of from 10:90 to 30:70.

7. An edible starch confection according to claim 5, wherein said potato dextrin and said tapioca dextrin are present in a ratio of 20:80.

8. A starch gum confection according to claim 5, wherein said starch gum confection includes sugar.

9. A starch gum confection according to claim 5, wherein said starch gum confection includes a flavoring.

10. A starch gum confection according to claim 5, wherein said starch gum confection is sanded with sugar.

11. An edible starch gum confection according to claim 5, wherein said starch gum confection further includes sugar, glucose, syrup, and water, and wherein said potato dextrin and tapioca dextrin constitute 25% by dry weight of said starch gum confection.

12. An edible starch gum confection having at least essentially no potato off-taste obtained by preparing, at elevated temperature, a quick setting starch composition that consists essentially of a potato dextrin and a tapioca dextrin, adjusting the dry substance content of said quick setting starch composition to from 80 to 85% dry substance, and thereafter molding the adjusted quick setting starch composition to obtain said starch gum confection.

13. An edible starch gum confection according to claim 12, wherein said potato dextrin is a pure potato dextrin, and said potato dextrin is rendered at least essentially free of potato off-taste by being washed with an organic solvent or subjected to enzymatic treatment with a peptidase.

* * * * *